UNITED STATES PATENT OFFICE.

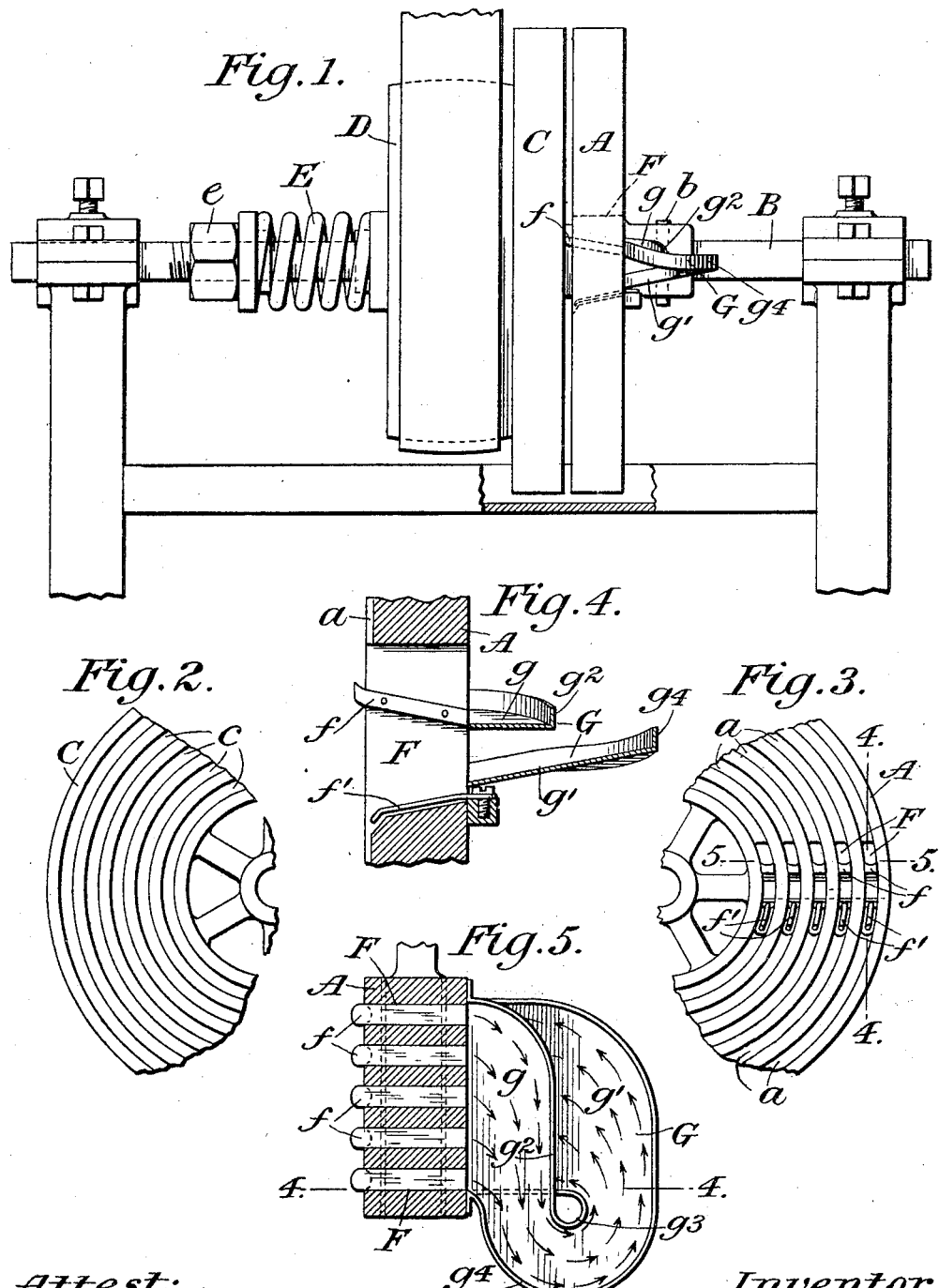

ERNST GUSTAV HOFFMANN, OF NEW YORK, N. Y.

BALL-GRINDING MACHINE.

No. 803,164.  Specification of Letters Patent.  Patented Oct. 31, 1905.

Application filed October 31, 1904. Serial No. 230,632.

*To all whom it may concern:*

Be it known that I, ERNST GUSTAV HOFFMANN, a subject of the German Emperor, residing in Tompkinsville, in the borough of Richmond, city of New York, in the State of New York, have invented certain new and useful Improvements in Ball-Grinding Machines, of which the following is a specification, reference being had to the accompanying drawings, forming a part hereof.

This invention relates to machines for the grinding of steel balls for use in ball-bearings and for other like purposes, and particularly to machines of this class in which the balls are ground between two relatively movable bodies, such as plates or disks or rollers, having in their working faces one or more grooves to receive the balls. Such machines as heretofore constructed have usually one stationary plate and another disk-like plate mounted to rotate adjacent to the stationary plate, each of such plates or grinders having in its working face one or more grooves concentric with the axis of rotation of the rotating plate or grinder.

The present invention is embodied in a machine of the particular type just referred to, although, as will be evident, some or all of the features of the invention might be embodied in a machine of a different type. In such machines as heretofore constructed there have been provided devices which permit interchange of balls between several grooves if the machine is provided with a plurality of grooves in each grinder, the purpose being to promote accuracy and uniformity in size of the balls. Nevertheless defects have developed in the operation of such machines, such as the tendency of the balls to remain in the grooves into which they first enter without change in their relative positions in such grooves, the likelihood of balls reëntering the same groove after they have left it at the point of relief, and the failure of the balls to become thoroughly interchanged between different grooves, all of which defects are detrimental to accuracy and uniformity. Furthermore, it has developed in the operation of such machines that constant attention is necessary to bring about a proper distribution of the balls at the point of relief or interchange, while even then the jamming of balls at the point of interchange is frequent, resulting in the stopping of the operation.

It is the object of this invention to remedy these defects and to provide a machine in which even if there be but a single groove in each grinder the relation of the balls in such groove shall be changed and in which as each ball reaches the point of relief it shall be positively dislodged from the groove and in the case of a machine having a plurality of grooves shall be directed toward some other groove, whereby the interchange of balls between different grooves is assured and in which the choking of balls at the point of relief shall be practically impossible. All of these advantages in operation are attained, as more particularly explained hereinafter with reference to the accompanying drawings, in which the several features of the invention are represented for purposes of illustration and explanation of the nature of the invention as embodied in a machine having disk-like grinders with a plurality of grooves in their working faces.

In said drawings, Figure 1 is a side elevation of a simple form of a machine of the character referred to and embodying the invention. Fig. 2 is a face view of a portion of the rotating grinder. Fig. 3 is a face view of a corresponding portion of the stationary grinder, showing particularly the means for positively dislodging the balls from the grooves and for preventing the jamming of the balls as they are returned to the grooves. Fig. 4 is a sectional detail view on the plane indicated by the line 4 4 of Fig. 3. Fig. 5 is a sectional detail view on the plane indicated by the line 5 5 of Fig. 3, showing also the ball mixer and interchanger in plan view.

The machine shown in the drawings and generally illustrated in Fig. 1 comprises a stationary disk A, having in its working face a series of concentric grooves $a$ and mounted upon a stationary shaft B, being held from rotation thereon and also from longitudinal movement by any suitable means, such as a pin $b$, passing through the hub of the grinder and the shaft and removable to permit the grinder A to be moved back upon the shaft when necessary. A rotating grinder C, likewise having in its working face a series of concentric grooves $c$, is mounted to rotate upon the shaft B and is provided in the machine shown with a suitable wheel or belt-pulley D, by means of which the grinder C may be rotated. It may also be pressed toward the grinder A with the necessary pressure by means of a stiff spiral spring E, surrounding the shaft B and abutting against a nut $e$, which is threaded upon the shaft B for the purpose of permitting adjustment in pressure. All of the parts thus far referred to may be constructed and arranged as may be desired except so far as concerns those parts formed on or carried by the stationary grinder which are involved in the dislodging of the balls from the grooves and the mixing and interchange of the balls and the return of the same again to the grooves. It is with respect to these last-named parts that the present invention is particularly concerned.

At a convenient point the grooves $a$ of the stationary guide A are interrupted, and at this point are located the devices which have to do with the removal and return of the balls from and to the grooves. As indicated in Figs. 3, 4, and 5 of the drawings, there is formed through the stationary grinder a slot F in alinement with each of the grooves $a$, and in such slot is placed a finger $f$, which projects beyond the bottom of the groove and may project slightly into the corresponding groove $c$ in the rotating grinder, the function of such finger being to stand in the path of the balls in the corresponding groove sufficiently to dislodge positively each ball from the groove as it reaches the point where the finger is located. Each finger $f$ discharges the balls from the corresponding groove upon a table G, which affords a considerable surface upon which the balls may roll and also directs the balls back toward the grooves below the fingers $f$, being preferably slightly inclined toward the lower portion of the slots F. If the machine has a single groove only in each grinder, the table G is so formed as to direct the balls back to the lower portion of the same slot $f$, through which they are discharged upon the table, and has such an extent as to cause collisions between the balls as they are discharged and returned, whereby they do not reënter the groove in the same order in which they left it, but their relations are changed, this change in relation of the balls in the groove being an important factor in securing uniformity of the balls and in preventing wear of one ball upon another sufficient to abrade the surface of one of the balls. If, however, the machine is provided with a plurality of coöperating grooves, as represented in the drawings, the table G is of such a character as not only to effect a change in the relationship of the balls in a single groove, but to thoroughly mix the balls as they are discharged from the grooves by the fingers $f$, so as to bring about an interchange of the balls between the different grooves, accomplishing the return of a ball to a groove different from that from which it was just discharged.

It is not essential to the effective operation of the machine either that the balls from one certain groove shall be returned to another certain groove or that every ball shall without fail be returned to a different groove. It is sufficient and, in fact, uniformity of the balls is amply assured if the balls are given a tendency to return to different grooves, whereby most of them do so return to different grooves while some may return to the same groove. In any event the device becomes a mixer by which the balls are more or less thoroughly mixed as they are discharged from the several grooves before they are again returned to the grooves. To effect such mixing, the table G is given a spiral arrangement, the portion $g$ thereof upon which the balls are discharged by the fingers $f$ being located above the portion $g'$ thereof by which the balls are returned to the grooves below the fingers $f$, while an intermediate wall $g^2$ and turning post $g^3$ separate the portion $g$ of the table from the portion $g'$ thereof, and an outer wall or rim $g^4$ prevents the escape of the balls. The floor of the table is preferably elevated somewhat at its outer edge in order to promote the desired travel of the balls. Thus it will be seen that balls from the inner slot F will strike the intermediate wall $g^2$ and taking a short turn about the post $g^3$ will, for the most part, reënter one or another of the outer grooves, while the balls discharged from the outer grooves will, for the most part, follow along the rim $g^4$ of the table and reënter the inner grooves. A thorough mixing and interchanging of the balls is thus secured and the attainment of uniformity in the size of the balls is promoted.

In order to prevent the jamming of the balls as they reënter the grooves without requiring the constant attention of an operator, each of the slots F has a yielding bottom, preferably consisting of a spring-wire $f'$, which is secured by its outer end to the bottom of the slot or to the table and at its inner end is free and normally slightly above the bottom of the slot. With this arrangement should it happen that one ball rolls on top of another in contact with the rotating grinder the spring-floor will yield to the pressure of the lower ball and permit it to escape from the upper ball without jamming.

The operation of the special features of the invention has been sufficiently described and will require no further explanation herein. So far as the machine as a whole is concerned it will be understood that when the grinders are assembled, as shown in Fig. 1, and the operation of the machine has commenced the balls are placed upon the table G and fed to the machine with emery and oil until the desired quantity has been introduced. When the grinding has been continued for the proper length of time, the balls may be removed as they are discharged upon the table or the grinders may be separated to permit the balls to fall into a proper receptacle placed beneath them.

The spiral form of mixer shown is desirable for its purpose, but may be replaced by some other form of hopper. It will also be evident that so far as the general features of the machine are concerned it may be constructed and arranged as desired and that so far as concerns the particular features in which the invention is directly involved various changes in form and arrangement may be made to suit the general character of the machine and the particular result to be accomplished.

I claim as my invention—

1. In a ball-grinding machine, the combination of coöperating grinders having one or more grooves in their working faces and means for positively dislodging the balls from the grooves, substantially as described.

2. In a ball-grinding machine, the combination of coöperating grinders having grooves in their working faces and means for positively dislodging the balls from the grooves, and means for changing the relative positions of the balls in the grooves, substantially as described.

3. In a ball-grinding machine, the combination of coöperating grinders, one of which is stationary and the other movable, said grinders having grooves in their working faces and said stationary grinder having an outlet to permit the discharge of the balls, and a mixer upon which the balls are discharged and mixed and by which they are returned to the grooves, substantially as described.

4. In a ball-grinding machine, the combination of coöperating grinders, one of which grinders is stationary and the other movable, said stationary grinder having an outlet through which the balls may be discharged, a finger projecting from said opening into the path of the balls to dislodge the same, and a table upon which the balls are discharged and by which they are returned to the grooves below the finger, substantially as described.

5. In a ball-grinding machine, the combination of coöperating grinders having a plurality of grooves in their working faces, one of said grinders having an outlet and means for receiving the balls through said outlet and directing them to other grooves, substantially as described.

6. In a ball-grinding machine, the combination of coöperating grinders having one or more grooves in their working faces, one of said grinders having an outlet, and a table in spiral form to receive the balls and to return them to the grooves at a lower point, substantially as described.

7. In a ball-grinding machine, the combination of coöperating grinders having one or more grooves in their working faces, one of said grinders having an outlet, means to positively dislodge the balls from the grooves, and a table in spiral form to receive the balls through said outlet and to return them to the grooves below said dislodging means, substantially as described.

8. In a ball-grinding machine, the combination of coöperating grinders having one or more grooves in their working faces, one of said grinders having an outlet, a finger projecting from said opening into the path of the balls and a table in spiral form to receive the balls dislodged by said finger and to return the balls to the grooves below said finger, substantially as described.

9. In a ball-grinding machine, the combination of coöperating grinders having one or more grooves in their working faces, one of said grinders having an outlet through which the balls are discharged and returned to the grooves, and a yielding bottom to prevent the jamming of the balls, substantially as described.

10. In a ball-grinding machine, the combination of coöperating grinders having one or more grooves in their working faces, one of said grinders having an outlet, a finger projecting through said outlet into the path of the balls to dislodge the same, and a yielding bottom upon which the balls are returned to the grooves, substantially as described.

11. In a ball-grinding machine, the combination of coöperating grinders having one or more grooves in their working faces, one of said grinders having an outlet, a finger projecting through said outlet into the path of the balls, a yielding bottom, and a table to receive the balls dislodged by the finger and to return the balls upon said yielding bottom, substantially as described.

This specification signed and witnessed this 25th day of October, 1904.

ERNST GUSTAV HOFFMANN.

In presence of—
ANTHONY N. JESBERA,
M. A. BRAYLEY.